United States Patent [19]

Maynard et al.

[11] 4,371,779
[45] Feb. 1, 1983

[54] ENERGY SAVING WATER HEATER CONTROL CIRCUIT

[76] Inventors: Arthur D. Maynard, P.O. Box 95; Joseph L. Abrams, 960 Apple La., both of Altamonte Springs, Fla. 32701

[21] Appl. No.: 188,975

[22] Filed: Sep. 19, 1980

[51] Int. Cl.³ .......................... H05B 1/02; F24H 9/20
[52] U.S. Cl. ............................ 219/328; 122/4 A; 122/13 A; 126/351; 137/341; 219/309; 219/337; 219/496; 236/25 R; 237/8 A
[58] Field of Search .............. 219/327, 328, 331, 333, 219/334, 309, 496, 332, 308, 337; 222/146 HE; 236/25 R, 25 A; 137/341; 126/351; 122/4 A, 13 A; 237/8 R, 8 A

[56] References Cited

U.S. PATENT DOCUMENTS

| | | | |
|---|---|---|---|
| 1,196,487 | 8/1916 | Simon | 219/309 |
| 3,254,796 | 6/1966 | Wright | 222/146 HE |
| 3,952,182 | 4/1976 | Flanders | 219/309 |
| 4,016,402 | 4/1977 | Scott | 219/328 X |

FOREIGN PATENT DOCUMENTS 825732 12/1959 United Kingdom ................ 219/327

*Primary Examiner*—A. Bartis
*Attorney, Agent, or Firm*—Lackenbach, Siegel, Marzullo, Presta & Aronson

[57] ABSTRACT

An energy saving control circuit for a water heater having a hot water storage tank provided with an electrically operated heater, i.e., an electric heater or an electrically controlled combustion burner, includes a water flow detection device associated with either the cold water inlet or hot water outlet of the tank for sensing the flow of water into or out of the tank and arranged to energize the heater upon detection of water flow indicative of the withdrawal of water from the tank. A holding circuit maintains the heater energized, even though the flow of water ceases, until such time as a thermostatic switch responsive to the temperature of the water in the tank disables the holding circuit and deenergizes the heater upon the water stored in the tank attaining a predetermined desired temperature. The heater remains deenergized notwithstanding the demand for heat by the thermostatic switch until such time as the water flow detector once more detects the withdrawal of hot water from the tank and the cycle of operation is repeated. Thus two interdependent conditions must simultaneously obtain for heater energization, i.e., (1) detection of heat demand by the tank thermostatic switch and (2) detection of water flow by the flow detection device.

4 Claims, 4 Drawing Figures

4,371,779

ENERGY SAVING WATER HEATER CONTROL CIRCUIT

BACKGROUND OF THE INVENTION

FIELD OF THE INVENTION

This invention relates to control circuit means for a hot water heating system and in particular to such means enabling significant reduction in energy consumption and, correspondingly, costs attributable thereto.

In the past, various types of hot water heating systems and control circuits therefor have been devised. The conventional system employs simple thermostatic means for actuating the heater element when the water falls below a predetermined temperature controlled by the thermostat setting. This may waste energy, for example, when the hot water heating system services a house where all occupants are normally away for extended periods of time as may occur during the working day, holidays, vacations, and the like. Provision has been made for manual switches to turn off the hot water heating system during vacations, but this involves manual operation and thus the inherent possibility of merely forgetting to turn off the switch. Other serious disadvantages detract from the reliability and efficacy of simple switch-type systems or for that matter, systems which in general depend upon a thermostat device as the sole or principal means for activating the water heating element. For example, malfunction of the switch, a condition which might very well go unnoticed for a time, could restore the thermostat as the sole means for water temperature control depending upon the circuitry, i.e., assuming the malfunction to isolate the switch component from an otherwise operative electric circuit involving the thermostat and heating element; should the thermostat by mistake, inadvertence etc., be set excessively high, energy waste continues unabated until such time as the proper setting is registered. The water might well undergo repeated heatings to maintain the excessive temperature by virtue of thermostatic activation of the heating element. This situation obtains even if an on-off switch be operative in the heating element circuit should it, of course, be in the "on" position. This is particularly the case in households where children or others are present who might for some reason be incompetent to precisely set the thermostat but who nevertheless have access thereto.

In view of escalating energy demands and associated costs as well as the ever present threat of curtailment of the available energy supplies through depletion or limitation imposed by ultimate suppliers, energy saving measures are a prime focus of industrial as well as governmental organizations.

Thus, a primary object of the invention is to provide control circuit means wherein the foregoing and related problems are eliminated or at least mitigated to a substantial extent.

Another object of the invention is to provide control circuit means for water heating units enabling substantial reductions in energy waste and correspondingly in operating costs.

Still another object of the invention is to provide control circuit means for heating elements wherein any requirement for switch means to isolate a thermostat device from the heating element circuit is eliminated.

Yet another object of the invention is to provide such means capable of minimizing energy losses which would otherwise result from excessively high thermostat settings.

A further object of the invention is to provide such means wherein the thermostat means is eliminated as the sole operative means for activating the heating element.

Yet a further object of the invention is to provide such means capable of economical and simple manufacture and installation.

Other objects and advantages of the invention will become more apparent hereinafter as the description proceeds.

The attainment of the foregoing objects is made possible in accordance with the invention which in its broader aspects provides in a hot water heater having a tank, a cool water inlet and a hot water outlet and heating means for heating water in said tank, the improvement comprising a control circuit. The control circuit includes a detection device for indicating water flow, thermostat means for controlling operation of said heating means to heat said water to a predetermined temperature and thereafter de-energizing said heating means. The detection device actuates said heating means upon detection of water flow with respect to said tank to again heat the water in said tank to said predetermined temperature. Holding means for a relay controlling the termostat means is also provided.

SUMMARY OF THE INVENTION

The present invention overcomes the disadvantages of the prior art control circuits for hot water heating systems by providing detection means for monitoring or sensing water flow in the hot or cold water conduit system. In response to such water flow, the detection device actuates a relay closing an operative electric circuit from a source of electric power through thermostat means to electrically actuated heating means. Activation of the heater element raises the temperature of the water in the heating tank to a predetermined value corresponding to the thermostat setting. At this point, the thermostat means opens thereby deactivating or de-energizing the electrically actuated heater. The deactivated condition obtains until there is water flow in the hot water heating system sensed by the aforesaid detection means whereupon the heating cycle is repeated.

The invention is described in detail by reference to the accompanying drawing wherein:

FIG. 3 is a wiring diagram of an embodiment of the control circuit according to the present invention including both relay and transformer components, and, FIG. 4 is a wiring diagram of a modified embodiment of the control circuit similar to FIG. 3 but omitting the transformer component and wherein:

DETAILED DESCRIPTION OF THE INVENTION

Figure 1:
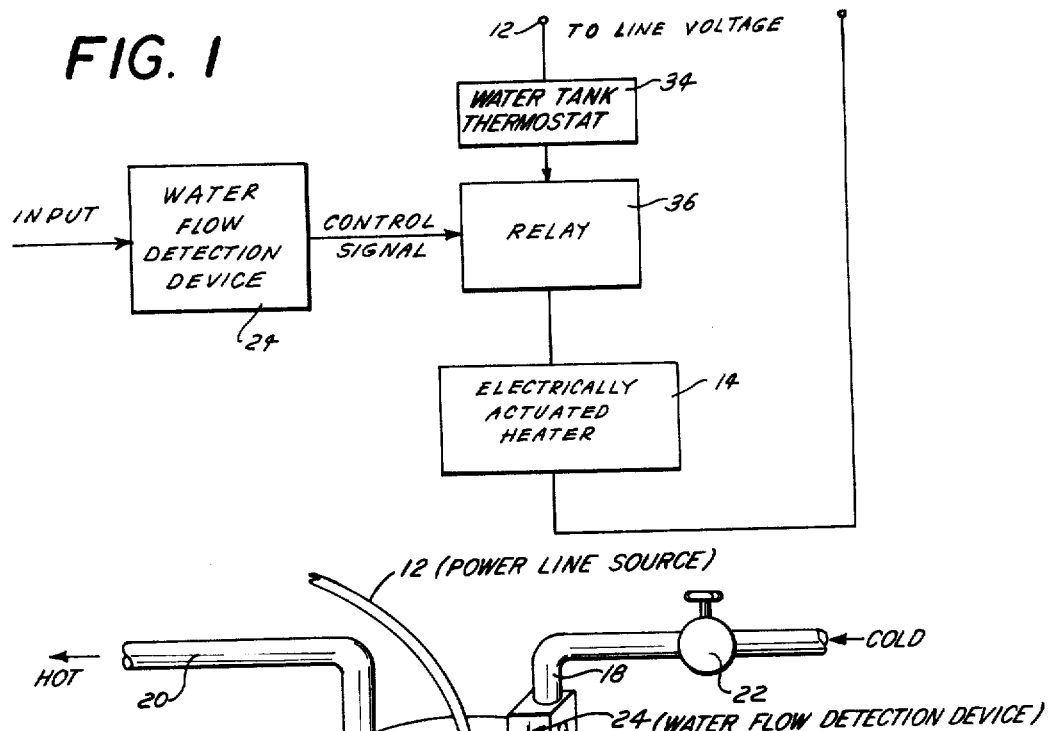
FIG. 1 is a schematic diagram of the control circuit according to the invention.
Figure 2:
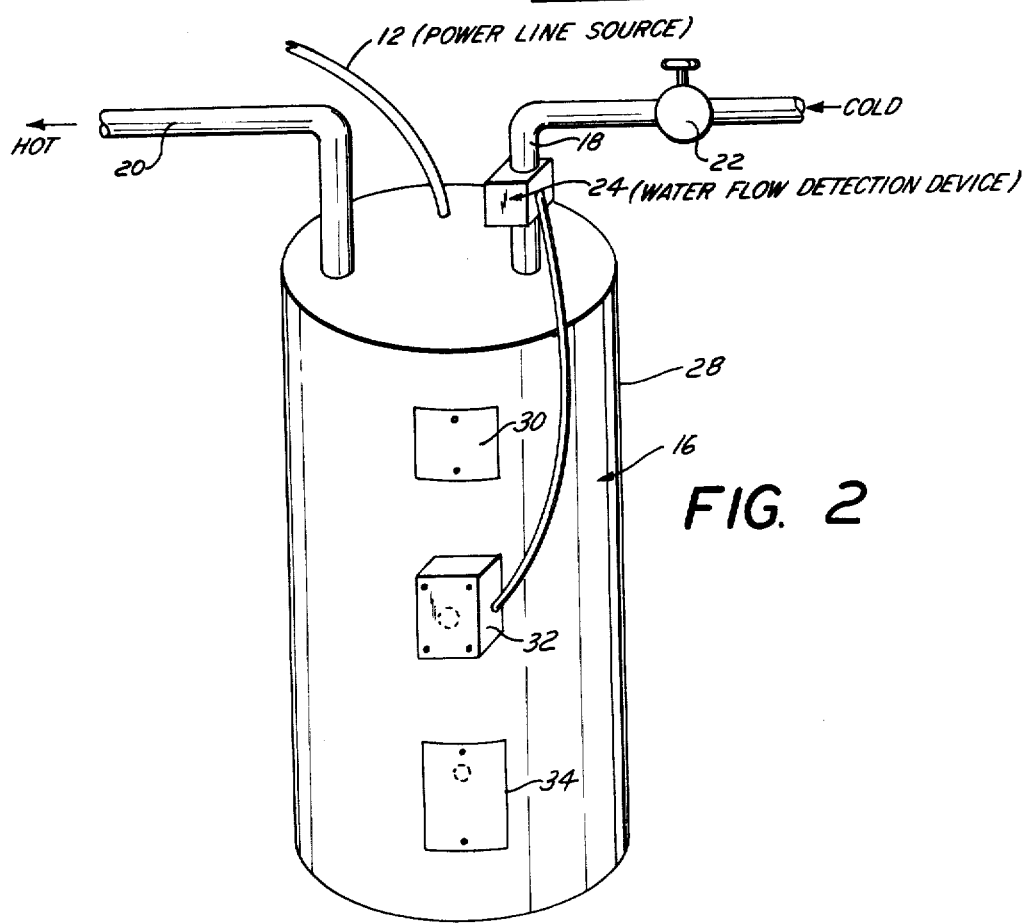
FIG. 2 is a schematic illustration of the relative location of components utilized in the present invention.

In the specification like reference numerals designate similar parts throughout the various views. In the following discussion, the detection device is positioned in the cold water line. However, this device may alternatively be included in the hot water line as will be discussed in more detail hereinafter. The control circuit according to the present invention is generally indicated at 10 and is for the purpose of controlling an operative electric circuit from a source of power 12 to an electrically actuated heater element 14. The latter can be an electric heater having a heater coil connected to the source of electric power or alternatively a gas or oil heater having electric or electronic ignition, pilot valves, main fan or pump motors, solenoid valves or the like that are electrically actuated by virtue of their operative association with the control circuitry described herein.

The electrically actuated heater 14 includes a tank 16 having a cold water inlet conduit 18 and a hot water outlet conduit 20 which feeds one or numerous hot water taps. Opening of any of the hot water taps will initiate hot water flow out of tank 16 and cold water flow through inlet 18 to the tank. A valve 22 for controlling inlet water into tank 16 is provided in inlet line 18 as is a water flow detection device 24 provided with normally open switch 26. The precise type of detection device is optional and may be a flow switch, pressure switch, temperature responsive device, accoustically actuated device or the like which is responsive to water flow.

The tank includes an outer protective shell 28 provided with an access plate 30. The control circuit includes components mounted in a control box 32 generally disposed within the shell 28 behind the access plate 30, but for illustration purposes is shown suitably mounted to the shell 28. Control box 32 contains a relay 36 or transformer 38 as needed and may contain other components as will hereinafter be described. Holes may be drilled in shell 28 and conventional wire nippers or pliers used to grip and pass all electrical conductors through the shell as is necessary in fabrication.

Figure 3:
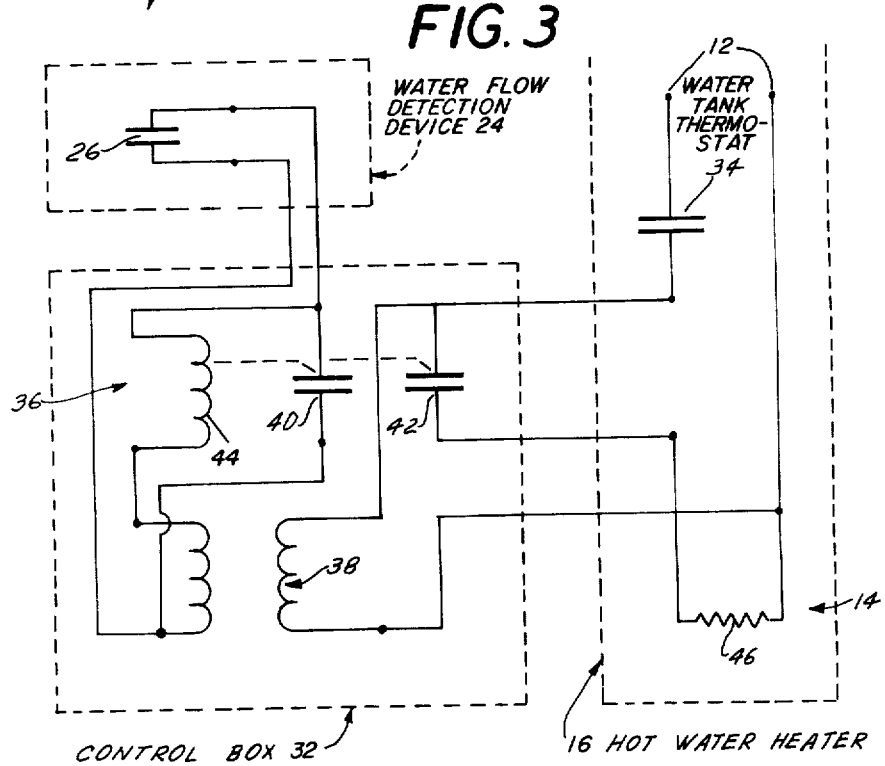

Referring now to FIG. 3, illustrating the use of both relay and transformer components and wherein relay 36 is a 24 volt relay serviced by 240/24 volt transformer 38 which is mounted in control box 32. Relay 36 has normally open contacts 40 and 42 which are closed upon excitation of coil 44 upon closing of detection device contact 26 in response to water flow in the hot water system. Relay 36 is locked closed by contact 40 as is heater element 46 of electrically actuated heater 14 when contact 42 is closed. Heater element 46 and relay coil 44 remain energized until thermostat 34 opens, the latter occurring when the water has reached the preset temperature.

Figure 4:
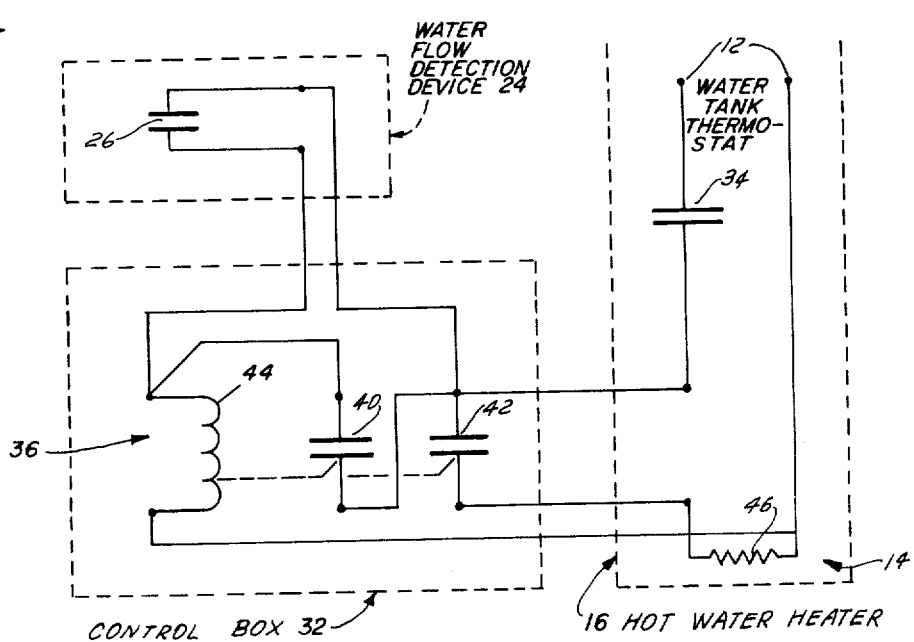

In the embodiment shown in FIG. 4, omitting transformer 38, the thermostat 34 is normally closed calling for heat whenever the water in the electrically actuated heater 14 is at a temperature less than that of the predetermined temperature as indicated by the thermostat setting. When a hot water tap is opened, replacement water will flow through inlet 18 past detection device 24 to close the energizing coil 44 of the relay 36 thereby closing contacts 40 and 42. Relay 36 is in this embodiment a 240 volt relay. Contact 40 maintains relay 36 energized while thermostat 34 is closed until the predetermined water temperature has been reached. This occurs even though water flow ceases. Contact 42, when closed, completes an operative electrical circuit to heater element 46 of electrically actuated heater 14. The circuit to heater element 46 remains closed until thermostat 34 opens when the predetermined temperature is reached.

Under the circumstances where no hot water is used, the hot water in the tank will slowly cool as it is heavily insulated. If, for example, the occupants of a house served by this control circuit are away for several hours or days, there will be no wasted energy due to maintenance of tank water at elevated temperature. As soon as the occupants return, turning on a hot water tap activates the detection device and included electrical circuits resulting in the water being quickly heated to the predetermined temperature according to the aforedescribed chronology.

In accordance with the invention, and as is manifest from the foregoing, the control circuit in effect removes the thermostat as the sole operative element for activating the heating element of the water heater. Thus, two interdependent conditions must simultaneously obtain for heater element activation, they being (1) a demand for heat by the thermostat and (2) activation of the control circuit induced by water flow in the line including the detection device. Should the thermostat be mistakenly set too high as previously allowed to, energy waste is minimized since upon completion of the initial heating cycle, the heating system is deactivated until such time as water flow is again sensed by the detection device. By contrast, if only a conventional thermostat system, even including a shutoff switch (in the "off" position), is the operative means for heater element activation, the heating cycle is continually repeated to maintain the excessive temperature since water temperature rather than water flow is the activating means for heater element energization.

In accordance with a particularly preferred embodiment of the invention, the detection device herein is positioned in the cold water line. This avoids the possibility of damage to the device which might otherwise result due to prolonged exposure to high temperature. For example, transducer type detection devices are known to be highly sensitive to elevated temperatures encompassing the hot water range. Thus, when the transducer unit cools off after a protracted period, it is often found that its water flow sensitivity is reduced and consequently, its operating efficiency. The useful life of the device can be seriously impaired. In addition, detection devices of the flow or paddle switch type are often constructed at least in part of heat sensitive plastic materials which deteriorate or structurally fail if exposed to high temperatures for prolonged intervals. For example, should the heater element short out, water heater temperature can go to 180° to 200° F. This would in all probability render the detection device incapable of further use.

It will be further understood that the sensitivity of the detection device will be controlled so as to avoid the possibility of reacting to a leaky faucet condition. This can be simply effected by merely calibrating the device in accordance with conventional operating parameters so that only water flow rates consistent with deliberate water tap manipulation serve to actuate the detection device and included control circuitry. Pressure sensitive transducers are particularly useful in this connection as the detection device.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. In a hot water heater having a tank provided with a cold water inlet and a hot water outlet and electrically operated heating means for heating water in said tank, the improvement comprising a control circuit for controlling operation of said heating means in response to water usage, said control circuit comprising a detection means for sensing water flow in one of the cold or hot water lines, thermostat means responsive to the temperature of the water in the tank for controlling operation of said heating means to heat said water to a predetermined temperature and thereafter deactivating said heating means, said control circuit including an electrically operated relay in circuit with said heating means and energized by said detection means to energize said heating means upon detection by said detection means of water flow indicative of the withdrawal of hot water from said tank, holding circuit means simultaneously energized with said relay by said detection means for maintaining said relay and heating means energized even should the flow of water stop, said thermostat means being in series with said relay and said holding circuit means and arranged to permit energization of said relay and holding circuit means only if the water in said tank is below the said predetermined temperature.

2. In a hot water heater according to claim 1, wherein said detection means includes a normally open switch normally breaking the circuit from a source of electric power to said relay.

3. In a hot water heater according to claim 2, wherein said holding circuit means includes contact means for maintaining an operative electric circuit from a source of power through said relay to said heating means, even though said normally open switch has opened upon cessation of water flow, until said thermostat means opens.

4. A control circuit according to claim 1, wherein said detection means monitors cold water flow from said water inlet to said tank.

* * * * *